(12) United States Patent
Oriet et al.

(10) Patent No.: US 7,753,409 B2
(45) Date of Patent: Jul. 13, 2010

(54) STEERING ASSEMBLY MECHANISM FOR ADJUSTING A STEERING WHEEL FROM ASYMMETRY TO SYMMETRY

(75) Inventors: Leo P. Oriet, Rochester Hills, MI (US); Nouri Matar, Windsor (CA)

(73) Assignee: Navistar Canada, Inc. (CA)

( * ) Notice: Subject to any disclaimer, the term of this patent is extended or adjusted under 35 U.S.C. 154(b) by 305 days.

(21) Appl. No.: 12/060,297

(22) Filed: Apr. 1, 2008

(65) Prior Publication Data

US 2009/0242314 A1    Oct. 1, 2009

(51) Int. Cl.
*B62D 1/00*    (2006.01)
(52) U.S. Cl. .................... 280/771; 280/775; 280/779
(58) Field of Classification Search .............. 280/771, 280/775, 779
See application file for complete search history.

(56) References Cited

U.S. PATENT DOCUMENTS

| | | | | |
|---|---|---|---|---|
| 4,881,389 A * | 11/1989 | Alfon et al. | ................... | 70/209 |
| 5,085,466 A * | 2/1992 | Nakatsuka et al. | .......... | 280/775 |
| 6,318,756 B1 * | 11/2001 | Papandreou | ................. | 280/775 |
| 6,354,626 B1 * | 3/2002 | Cartwright | .................. | 280/777 |
| 6,386,062 B1 * | 5/2002 | Kaneko et al. | ................. | 74/552 |
| 6,390,505 B1 * | 5/2002 | Wilson | ........................ | 280/775 |
| 7,025,380 B2 * | 4/2006 | Arihara | ...................... | 280/775 |
| 7,104,156 B2 * | 9/2006 | Affleck et al. | ................. | 74/552 |
| 7,380,828 B2 * | 6/2008 | Menjak et al. | .............. | 280/779 |
| 7,527,293 B1 * | 5/2009 | Wang | ......................... | 280/771 |

* cited by examiner

*Primary Examiner*—Toan C To
(74) *Attorney, Agent, or Firm*—Jeffrey P. Calfa; Mark C. Bach

(57) ABSTRACT

A mechanism (30) in a steering assembly (8) allows asymmetry of a steering wheel (8) to be quickly corrected by the driver without use of tools.

15 Claims, 3 Drawing Sheets

STEERING ASSEMBLY MECHANISM FOR ADJUSTING A STEERING WHEEL FROM ASYMMETRY TO SYMMETRY

FIELD OF THE INVENTION

This invention relates generally to vehicles that are steered by steering wheels whose rims are grasped by drivers and turned to turn steering shafts that act through steering gears and linkages to steer wheels of the vehicles. More especially, the invention relates to a mechanism that enables the driver to adjust a steering wheel from a condition of asymmetry to a condition of symmetry without the use of tools when the steering shaft is steering the vehicle in a straight line of travel.

BACKGROUND OF THE INVENTION

In most cars and trucks, the driver sits behind a steering wheel that he or she grasps and turns to steer the vehicle. For favorable customer perception of a new vehicle, it is considered desirable that the steering wheel appear symmetric to the driver when the steering wheel is steering the vehicle in a straight line. In a steering system that is fully functional, a steering wheel that appears noticeably asymmetric when the vehicle is being steered in a straight line may incorrectly suggest a problem, or perhaps even a defect, to the driver or prospective purchaser, and at a minimum may create the impression of poor manufacturing quality. Extreme asymmetry may cause a condition that impairs driver visibility of instrument panel gauges and/or controls.

Asymmetry may also result from the manner in which a particular vehicle is being driven on a particular road surface. This is perhaps more true of large commercial vehicles like heavy trucks than of smaller passenger vehicles. Unevenly distributed cargo loads, the mass of a particular commercial truck or trailer body, and crown roadways are among potential causes for an asymmetric appearance of the steering wheel when a vehicle is being driven in a straight line on a road surface.

When a condition of asymmetry is deemed to need correction, a typical procedure is to disconnect the steering wheel from the steering shaft, re-position it on the shaft, and then re-connect it to the shaft.

The ability to make exactly the needed correction is problematic in a steering system where the steering wheel and steering shaft are connected to each other through a spline connection. Such a connection has a finite number of splines repeating at a defined angular interval. That fact presents only a finite number of possibilities for locating the wheel to the shaft.

If a typical angular spline interval is 4°, the resolution to which a splined steering wheel can be circumferentially registered with a splined steering shaft is the same. That constraint leaves the possibility that a steering wheel installed in a new vehicle in accordance with proper assembly procedures may present the appearance of having up to 2° of asymmetry in either clockwise or counterclockwise direction when steering the vehicle in a straight line.

Furthermore, correction of asymmetry by disconnecting the steering wheel from the steering shaft and then re-connecting it to the shaft creates the potential for mistake if due care is not exercised. A service technician or other individual performing the correction must comply with specified procedures that are developed by manufacturers at significant expense. When a manufacturer has no control over such person and cannot monitor the work being performed, a serious mistake resulting from the inability of the manufacturer to supervise technician repair may adversely impact the manufacturer even though the manufacturer is not at fault in any way. For trucks equipped with steering wheel air bags, OEM's and air bag suppliers recommend that only qualified licensed mechanics remove and install them because of the risk that static electricity or careless handing might cause their deployment if they are not handled in accordance with OEM/supplier installation/removal instructions. An untrained driver of such a truck seeking to adjust the steering wheel by removing it and re-positioning it, risks accidental air bag deployment in doing so.

And regardless of the above considerations, the time, tools, and effort needed to correct steering wheel asymmetry are significant. Moreover, they may be a source of warranty claims, even repeat claims, in vehicles under warranty.

SUMMARY OF THE INVENTION

The present invention provides a solution for correcting loss of steering wheel symmetry without having to disconnect the steering wheel from the steering shaft.

Principles of the invention are embodied in a mechanism that is a part of a vehicle's steering assembly and that is disposed between the steering wheel and a steering shaft lead to a steering gear. The correction of asymmetry can be performed by the driver without the use of tools.

In the particular example that is shown and described here, the mechanism provides a limited range of adjustment of the steering wheel to the steering shaft, no more than about 20° of adjustment (i.e. +10°/−10° from factory setting). The driver can quickly perform the adjustment by untightening a locking member in the mechanism to unlock the steering wheel from the steering shaft while the steered wheels of the vehicle are steering the vehicle in a straight line, turning the steering wheel to a condition of symmetry, and then tightening the locking member to once again lock the steering wheel to the steering shaft.

The mechanism comprises an outer bushing, or outer ring, and an inner bushing, or inner ring, surrounded by the outer ring. A lost motion interface between the rings comprises a radially open slot of defined circumferential width in a perimeter margin of one ring and a tooth of defined circumferential width less than the defined circumferential width of the slot in the other ring. The tooth extends radially from a perimeter margin of its ring into the slot. Because of the circumferential lost motion that is provided between the slot and the tooth at the interface when the mechanism is unlocked, the mechanism provides an adjustment range for the steering wheel relative to the steering shaft equal to the difference between the defined circumferential width of the slot and the defined circumferential width of the tooth.

Turning of the steering wheel during adjustment is limited in both circumferential senses by abutment of the tooth with radial walls of the slot. Should the locking member fail for any reason to lock the inner and outer rings together while the vehicle is being driven, the interface continues to provide a mechanical interlock between the steering wheel and the steering shaft, albeit with some lost motion between them. By having a limited adjustment range at the interface, the amount of lost motion is similarly limited to what is considered a temporarily tolerable amount of steering wheel play, but the failure should be promptly corrected.

The invention can be economically incorporated into existing steering assemblies without major design and manufacturing modifications.

One general aspect of the invention relates to a vehicle comprising a steering assembly for steering the vehicle. The steering assembly comprises a steering shaft that has a proximal end toward a driver of the vehicle and that is arranged to turn about an axis of turning to steer road wheels of the vehicle. A steering wheel that is coaxial with the axis of turning can be grasped by a driver and turned about the axis of turning. A mechanism couples the steering wheel and the steering shaft and comprises a first part that turns in unison with the steering wheel and a second part that turns in unison with the steering shaft. A lock selectively locks the two parts together for turning in unison with each other and unlocks the two parts from each other to allow them to turn relative to each other. A lost motion interface between the two parts constrains the amount of relative turning of the two parts to a defined range about the axis of turning, preferably not more than about 20°.

A further aspect of the invention relates to a method of circumferentially adjusting a steering wheel on a steering shaft in a motor vehicle for enabling the steering wheel to present an appearance of substantially exact symmetry with respect to a vertical plane through an axis of turning of the steering wheel when the steering shaft is steering road wheels of the vehicle in a straight line of travel.

The method comprises unlocking a first part that turns in unison with the steering wheel from a second part that turns in unison with the steering shaft to enable the two parts to turn relative to each other about the axis of turning, then with the steered wheels positioned for steering the vehicle in a straight line, turning the steering wheel to a position of substantial symmetry while causing a tooth that extends from one part radial to the axis of turning into a circumferentially extending slot in the other part to be displaced circumferentially within the slot, and then locking the two parts together for turning in unison about the axis of turning.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figures 1, 4:
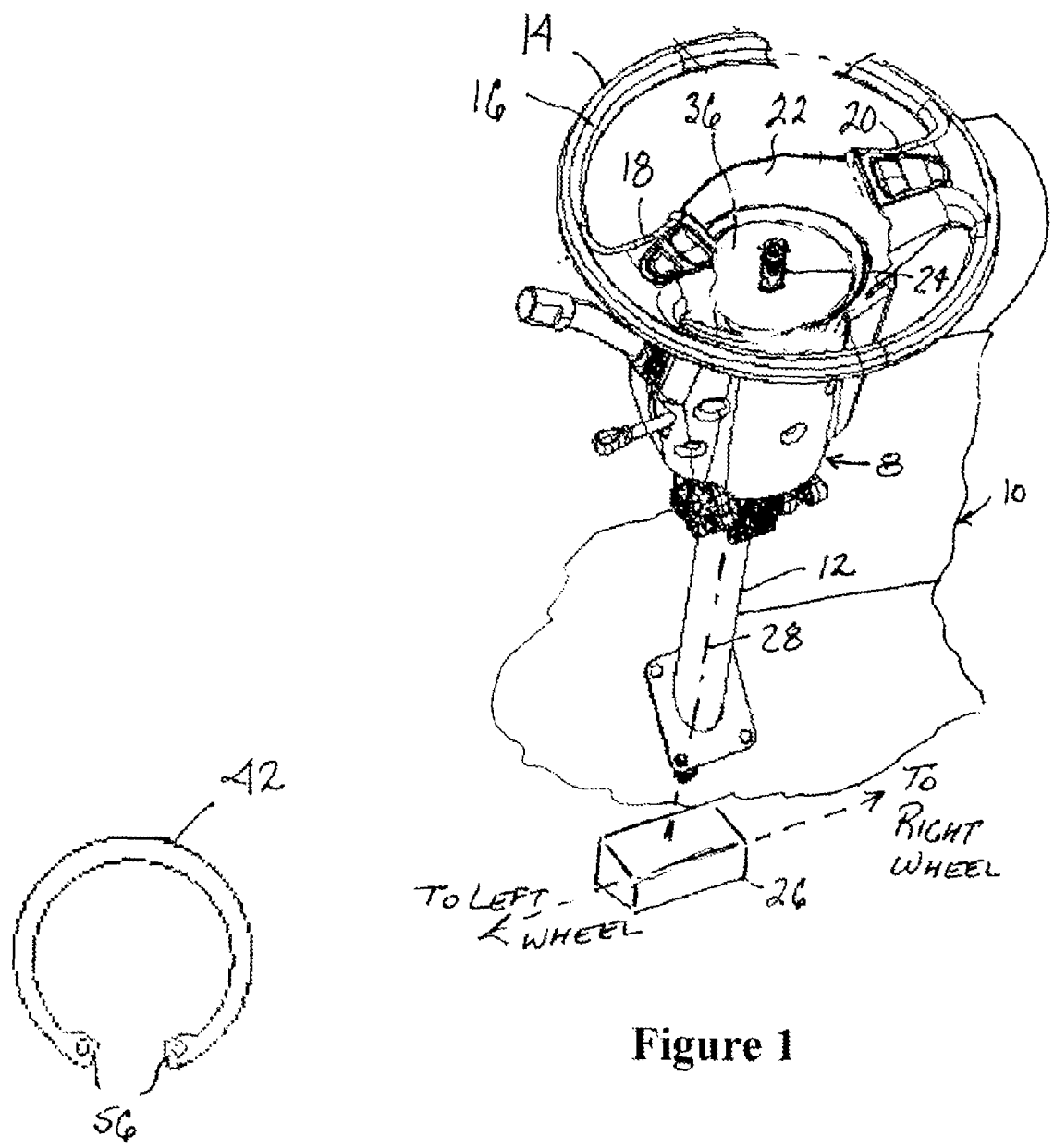
FIG. 1 is a perspective view, with portions removed, of a steering assembly for steering a motor vehicle.
FIG. 4 is a plan view showing one of the parts that appears in FIG. 2 by itself on a reduced scale.

The drawings show a steering assembly 8 in a motor vehicle 10. The steering assembly comprises a steering column 12 and a steering wheel 14. Steering wheel 14 comprises an outer rim 16 and two spokes 18, 20 extending radially inward from rim 16 to a central hub 22. Rim 16 is essentially circular. Spokes 18, 20 are arranged symmetric to rim 16.

Column 12 supports a steering shaft 24 for rotation within the column's interior. Shaft 24 has a proximal end that can be seen in FIG. 1. The distal end is coupled to a steering gear 26 having a conventional steering arm coupled by tie rods to left and right steered wheels of vehicle 10.

A properly adjusted steering wheel 14 has substantial symmetry with respect to a vertical plane that contains the axis 28 of steering shaft 24 when the steering assembly is in a position that is steering the vehicle in a straight line of travel on a flat horizontal surface. In other words, the vertical plane will bisect the steering wheel such that one spoke 18, 20 is located clockwise from the twelve o'clock position substantially the same number of degrees as the other spoke 18, 20.

When, for whatever reason, it becomes necessary to turn the steering wheel to a position where asymmetry becomes noticeable in order to steer the vehicle in a straight line of travel, the steering wheel is considered to have come out of adjustment.

Figure 2:
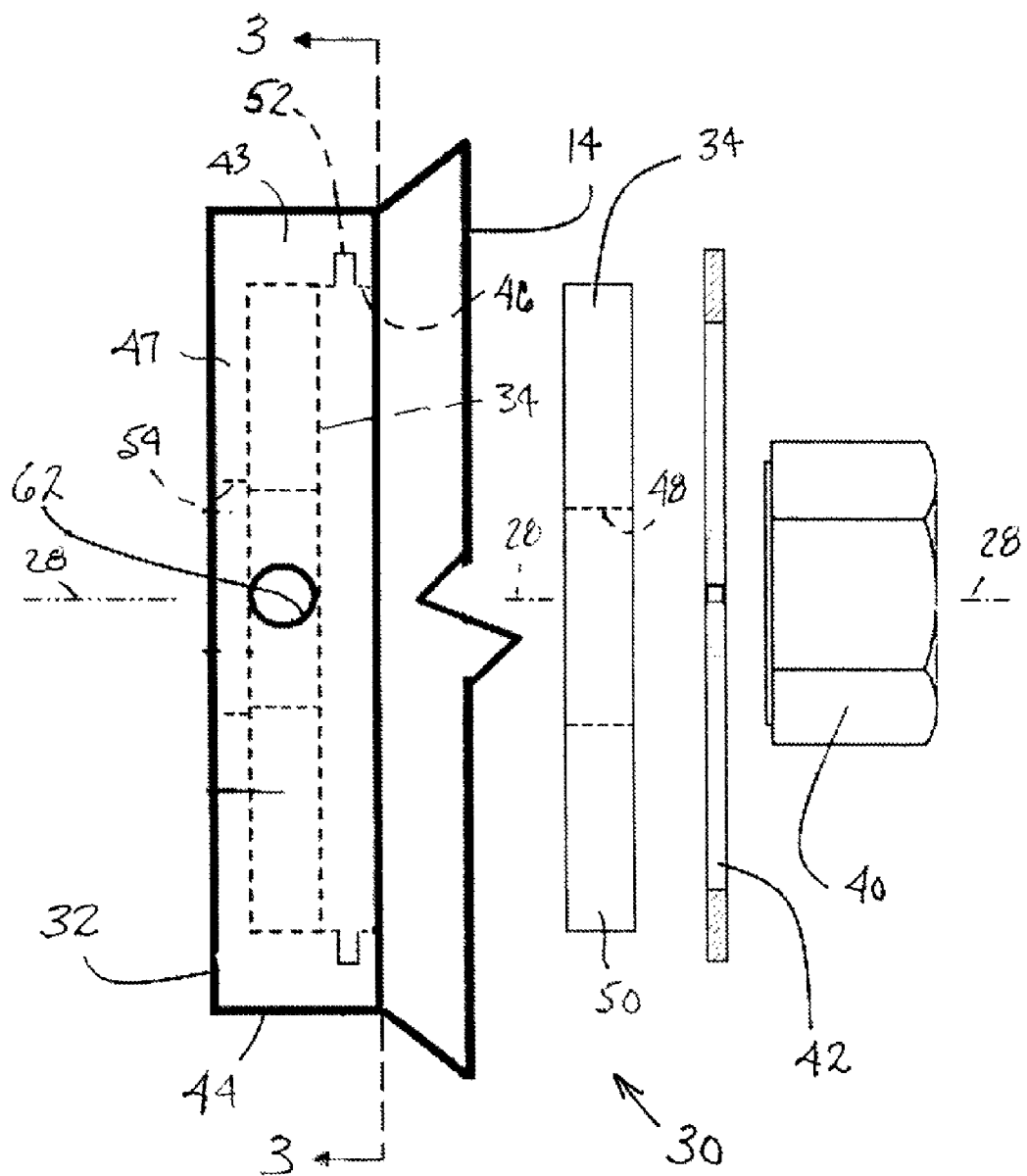
FIG. 2 is an exploded side elevation view of a portion of the steering assembly, illustrating application of principles of the invention to the steering column.
Figure 3:
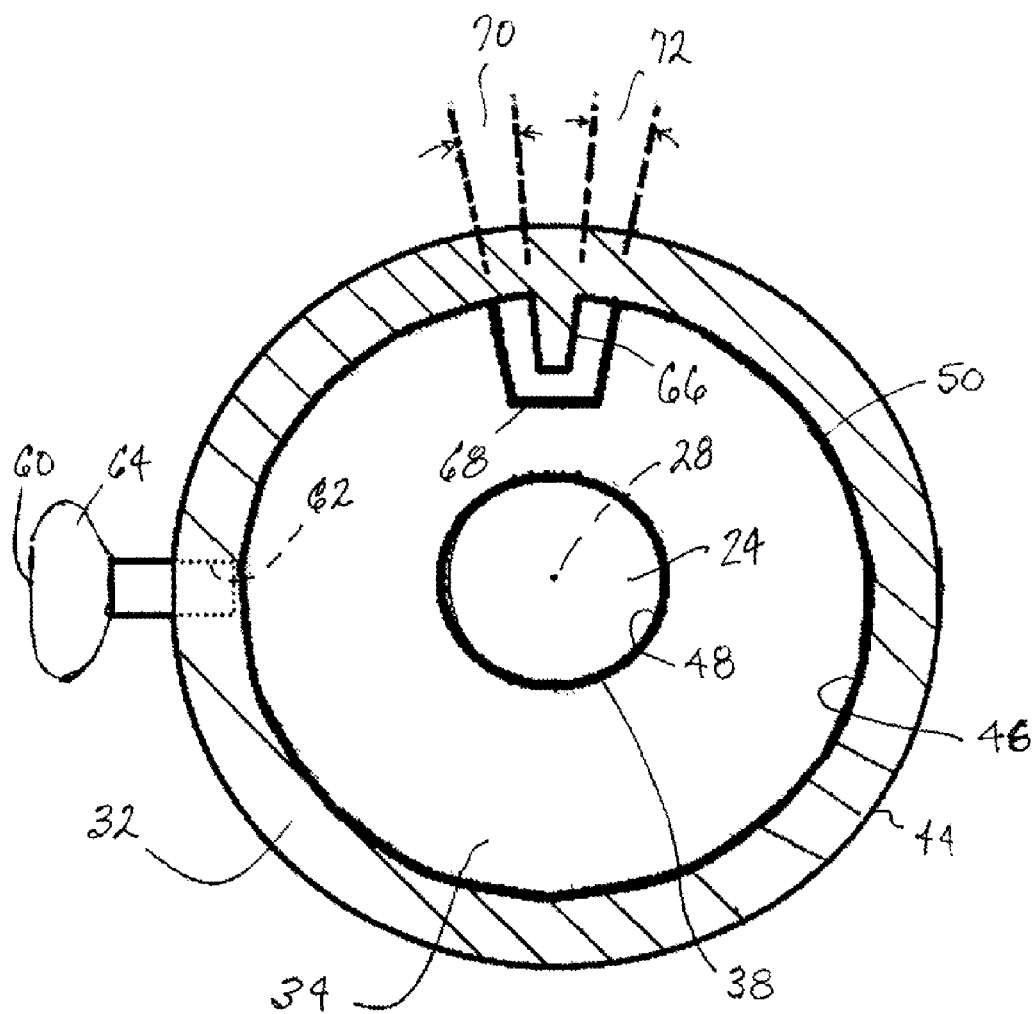
FIG. 3 is a view in the direction of arrows 3-3 in FIG. 2.

For enabling the driver to correct steering wheel 14 for loss of symmetry without use of tools, a mechanism 30, shown in FIGS. 2 and 3 is incorporated in steering assembly 8 coaxial with axis 28. Mechanism 30 comprises an outer bushing 32 within the interior of which an inner bushing 34 is disposed. While mechanism 30 is not shown in FIG. 1, it is assembled into the interior of steering wheel hub 22 to fit inside a generally circular cavity 36 at the bottom of the hub's interior.

Outer bushing 32 is fastened in any suitably appropriate way to hub 22 to turn in unison with steering wheel 14. Inner bushing 34 comprises a ring that turns in unison with steering shaft 24 by virtue of a spline connection 38 to shaft 24. A lock nut 40 attaches mechanism 30 to the steering shaft, and a snap retainer ring 42, shown by itself in FIG. 4, retains bushing 34 within bushing 32.

Bushing 32 has an outer axial wall 43 having a circular outer perimeter 44 and an inner perimeter 46 that is mostly circular. Bushing 32 also has an inner end wall 47 that for the most part closes the inner end of the bushing.

Bushing 34 has a splined inner perimeter 48 for fitting to a mating spline on steering shaft 24 near the proximal end of the shaft to make the spline connection 38. Bushing 34 also has an outer perimeter 50 that is almost fully circular for fitting closely, but with radial clearance, to an inner almost circular portion of inner perimeter 46 of bushing 32. The thickness of bushing 34 is essentially equal to the axial length of the spline on shaft 24.

In a direction toward steering gear 26, the spline on steering shaft 24 ends at a shoulder on the shaft. When mechanism 30 is in place in steering assembly 8, the inner face of bushing 34 that is toward steering gear 26 abuts that shoulder, with the abutment occurring between the margin of the bushing's splined inner perimeter 48 and the shoulder.

Bushing 34 is placed within the interior of bushing 32 through the open end of the bushing opposite end wall 47 to a position that closely confronts end wall 47. Bushing 34 is kept there by ring 42 being placed in a groove 52 in inner perimeter 46 so that the portion of the ring that protrudes from the groove presents radial interference to the bushing. Groove 52 is located in relation to end wall 47 to allow the two bushings to freely turn relative to each other about axis 28 while minimizing axial play between them.

The two bushings thereby form an assembly that can be installed in steering assembly 8 by aligning the assembly with axis 28 and moving it into cavity 36 to make the spline connection 38 while also placing the perimeter of a circular hole 54 in end wall 47 on a circular portion of shaft 24 adjoining the shaft shoulder beyond the shaft spline. With the assembly so placed, nut 40 is threaded onto the proximal end of shaft 24 and tightened against the outer face of bushing 34 to compress bushing 34 against the shoulder of shaft 24 and thereby securely fasten the bushing to the shaft.

Bushing 32 carries a locking member 60 that has a threaded engagement with a threaded radial through-hole 62 in wall 43 of the bushing. Locking member 60 is operable from the exterior of the column via a knob 64 that can be turned to selectively lock the two bushings 32, 34 together for turning in unison with each other and to unlock the two bushings from each other to allow them to turn relative to each other.

When knob 64 is turned in one sense about the axis of through-hole 62 to lock the two bushings together, it is effective to advance member 60 radially inward toward axis 28 to cause the inner end of member 60 to be forced against the outer perimeter of bushing 34 with sufficient force to lock the two bushings together by creating sufficient frictional resistance between the end of locking member 60 and the outer perimeter of bushing 34. The presence of knob 64 provides a mechanical advantage in turning member 60.

When knob 64 is turned in an opposite sense about the axis of through-hole 62 to unlock the two bushings, it is effective to move member 60 radially outward away from axis 28 to separate the inner end of member 60 from the outer perimeter of bushing 34, and hence unlock the bushings.

A lost motion interface between the two bushings constrains the amount of relative turning between them to a defined range about axis 28, preferably not more than about 20°. This interface comprises a radially open slot 68 of defined circumferential width in the outer perimeter of bushing 34 and a tooth 66 of defined circumferential width less than the defined circumferential width of slot 68 extending radially inward from the inner perimeter of bushing 32. The axial dimension of tooth along axis 28 is less than the distance between groove 52 and end wall 47.

When inner bushing 34 is being placed within outer bushing 32, the two are oriented such that tooth 66 is in circumferential registry with slot 68.

The axial dimension of the defined range of relative circumferential motion between the two bushings is equal to the difference between the defined circumferential width of slot 44 and the defined circumferential width of tooth 46. FIG. 3 shows the tooth circumferentially centered in the slot, enabling the steering wheel to be adjusted either 10° clockwise (reference numeral 72) or 10° counterclockwise (reference numeral 70). At each limit of the range, turning of the steering wheel is arrested by abutment of the tooth with a radial wall of the slot.

If adjustment of the steering wheel is needed to correct loss of symmetry, the steered wheels should be positioned such that the vehicle travel is in a straight line. Knob 64 is turned to unlock the bushings. The steering wheel is then turned to make it once again symmetric, and then the knob is once again tightened to lock the bushings. A level that is sometimes referred to as an inclinometer is often used to establish when the steering wheel is in a position of symmetry.

While the screw-operated friction lock arrangement that is been described and illustrated is elegantly effective in its simplicity, alternative locking arrangements are contemplated. Examples of such locking arrangements are spring-loaded mechanisms and center-over clamps. The use of friction locking as illustrated provides infinitely variable steering wheel adjustment within the allowed range.

Because the steering wheel does not need to be removed, re-adjusted, and replaced, the original factory integrity of the steering wheel assembly and its installation in a vehicle can be maintained. Risk of accidental deployment of a steering wheel air bag is also avoided.

While a presently preferred embodiment of the invention has been illustrated and described, it should be appreciated that principles of the invention apply to all embodiments falling within the scope of the following claims.

What is claimed is:

1. A vehicle comprising a steering assembly for steering the vehicle, the steering assembly comprising:
   a steering shaft that has a proximal end toward a driver of the vehicle and that is arranged to turn about an axis of turning to steer road wheels of the vehicle;
   a steering wheel that is coaxial with the axis of turning and can be grasped by a driver and turned about the axis of turning; and
   a mechanism coupling the steering wheel and the steering shaft comprising a first part that turns in unison with the steering wheel and a second part that turns in unison with the steering shaft, a lock for selectively locking the two parts together for turning in unison with each other and unlocking the two parts from each other to allow them to turn relative to each other, and a lost motion interface between the two parts that constrains the amount of relative turning of the two parts to a defined range about the axis of turning.

2. An assembly as set forth in claim 1 wherein the lost motion interface comprises a radially open slot of defined circumferential width in a perimeter margin of one of the parts and a tooth of defined circumferential width less than the defined circumferential width of the slot extending radially from a perimeter margin of the other part into the slot, the defined range being equal to the difference between the defined circumferential width of the slot and the defined circumferential width of the tooth.

3. An assembly as set forth in claim 2 wherein the one part is the second part and the other part is the first part.

4. An assembly as set forth in claim 3 wherein the first part comprises a ring surrounding the second part coaxial with the axis of turning, and the lock comprises a locking part carried by the ring.

5. An assembly as set forth in claim 4 wherein the locking part comprises a member that can be displaced on the ring radially of the axis of turning to different radial positions to lock the two parts together in one radial position and to unlock the two parts from each other in another radial position.

6. An assembly as set forth in claim 5 wherein the member comprises a radially inner end that when locking the two parts together is forced against the second part with sufficient force to lock the two parts together.

7. An assembly as set forth in claim 6 wherein the member comprises a screw thread threaded in a threaded hole in the ring and a knob on the exterior of the ring that when turned by a person's hand displaces the member radially by turning the member in the threaded hole.

8. A method of circumferentially adjusting a steering wheel on a steering shaft in a motor vehicle for enabling a spoke pattern of the steering wheel to present an appearance of substantially exact symmetry with respect to a vertical plane through an axis of turning of the steering wheel when the steering shaft is steering road wheels of the vehicle in a straight line of travel, the method comprising:
   unlocking a first part that turns in unison with the steering wheel from a second part that turns in unison with the steering shaft to enable the two parts to turn relative to each other about the axis of turning, then with the steered wheels positioned for steering the vehicle in a straight line, turning the steering wheel to a position of substantial symmetry while causing a tooth that extends from one part radial to the axis of turning into a circumferentially extending slot in the other part to be displaced circumferentially within the slot, and then locking the two parts together for turning in unison about the axis of turning.

9. A method as set forth in claim 8 including, while the two parts are unlocked, stopping the turning of the steering wheel by abutment of the tooth with a radial wall of the slot.

10. A method as set forth in claim 8, including the step of constraining relative turning of the two parts to a defined circumferential range.

11. A method as set forth in claim 10 wherein the step of unlocking the first part from the second part comprises displacing a locking member carried by one of the parts radial to the axis of turning in one radial direction, and the step of locking the two parts together comprises displacing the locking member in an opposite radial direction.

12. A method as set forth in claim 11 wherein the step of unlocking the first part from the second part comprises turning the locking member about its own axis in one sense, and the step of locking the two parts together comprises turning the locking member about its own axis in an opposite sense.

13. A method as set forth in claim 12 wherein the step of locking the two parts together by turning the locking member about its own axis in an opposite sense comprises forcing an end of the locking member against the other part with sufficient force to create sufficient frictional resistance between the end of the locking member and the other part to lock the two parts together.

14. A method as set forth in claim 13 wherein the step of locking the two parts together by turning the locking member about its own axis comprises advancing the locking member toward the axis of turning of the steering wheel.

15. A method as set forth in claim 14 wherein the step of turning the locking member about its own axis comprises turning the locking member by turning a knob that provides a mechanical advantage.

* * * * *